Dec. 4, 1962   J. CARLSTEIN   3,067,396
WOBBLE PLATE POTENTIOMETER
Filed May 16, 1960
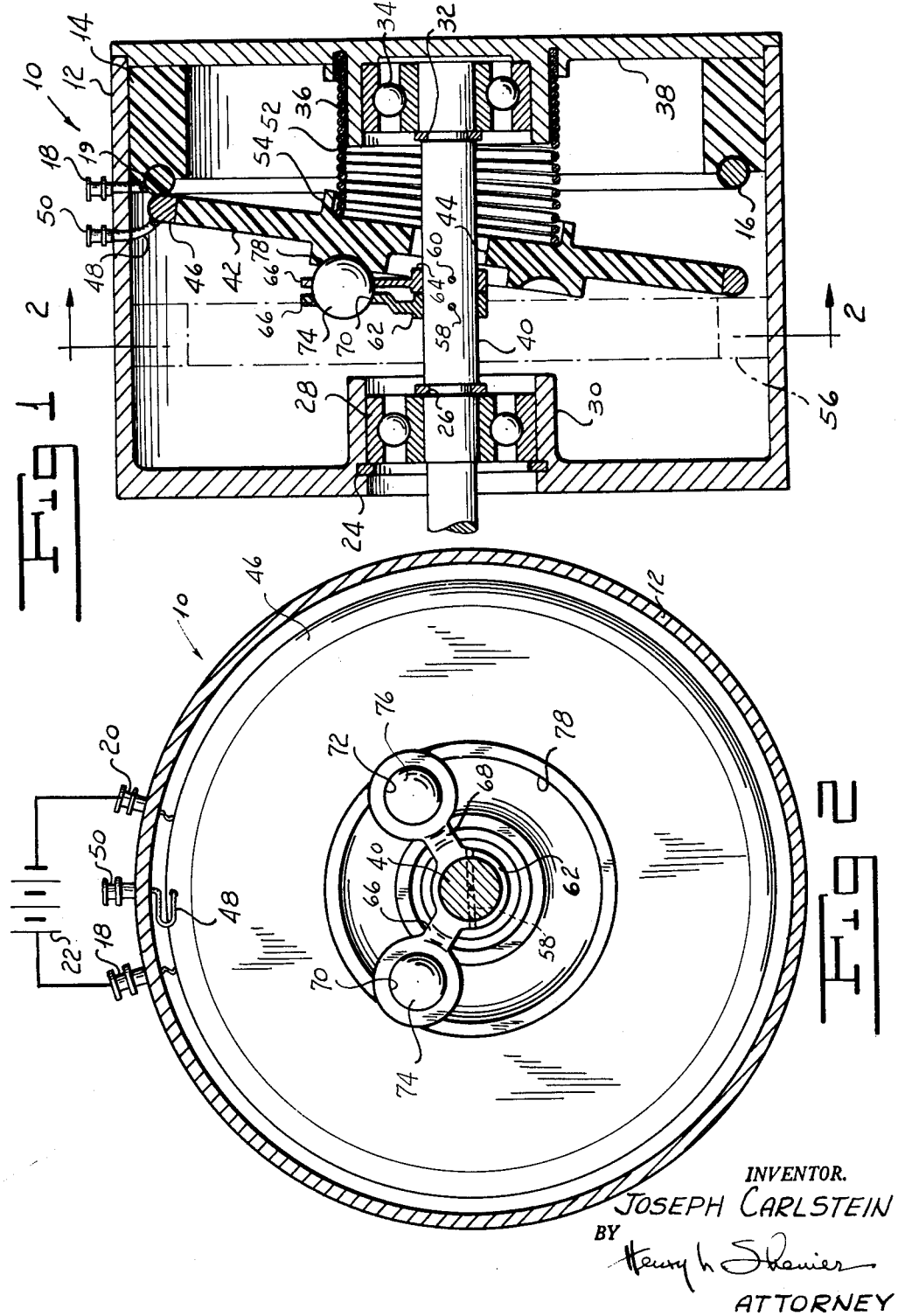
INVENTOR.
JOSEPH CARLSTEIN
BY
ATTORNEY

United States Patent Office 3,067,396
Patented Dec. 4, 1962

3,067,396
WOBBLE PLATE POTENTIOMETER
Joseph Carlstein, East Meadow, N.Y., assignor to United Aircraft Corporation, East Hartford, Conn., a corporation of Delaware
Filed May 16, 1960, Ser. No. 29,520
4 Claims. (Cl. 338—154)

My invention relates to an improved potentiometer and more particularly to a wobble plate potentiometer in which the wiper makes rolling point contact with the resistance element.

In substantially all types of potentiometer known in the prior art, a wiper element such as a brush or the like slides along a resistance element. This structure embodies a number of disadvantages. Owing to the fact that the same relatively limited area of the wiper engages the resistance element in all positions of the wiper, the latter wears relatively rapidly and thus must be replaced at frequent intervals. Material which wears off the wiper makes the resistanec element dirty and may cause its resistance per unit length to vary irregularly. Since sliding friction must be overcome in moving the wiper along the resistance element, a relatively large force is required to move the brush or wiper along the resistance element.

Attempts have been made in the prior art to overcome the defects of potentiometers employing sliding wipers by substituting a rolling contact for the sliding contact. While some of these attempts have been partially successful, the structures devised embody certain disadvantages. First, they do not permit substantially 360° of relative rotation between the wiper and the resistance element. Many of these devices while they do not require sliding of a contactor along a resistance, do employ a sliding element to actuate the contactor. In general devices of the prior art which embody attempts to overcome the disadvantages of sliding contact potentiometers are complicated and have a relatively short life.

I have invented a wobble plate potentiometer which overcomes the disadvantages of potentiometers of the prior art. My device entirely eliminates relative sliding of parts as the wiper moves over the resistance element. My wobble plate potentiometer permits contact of the wiper with the resistance element at any point substantially over the range from 0° through 360°. Owing to the manner of operation of my device, wear on the wiper is distributed over a very large surface area. My wobble plate potentiometer is simple in construction and is reliable in operation.

One object of my invention is to provide a wobble plate potentiometer which eliminates sliding contact between relatively movable parts.

Another object of my invention is to provide a wobble plate potentiometer in which wear of the wiper is distributed over a relatively large surface area.

A further object of my invention is to provide a wobble plate potentiometer which requires very little force to move its relatively displaceable elements.

A still further object of my invention is to provide a wobble plate potentiometer which permits a resistance variation through substantially 360° of rotation.

Still another object of my invention is to provide a wobble plate potentiometer in which the need for slip rings and brushes to bring out the varying contact point is eliminated.

Yet another object of my invention is to provide a wobble plate potentiometer having a high degree of accuracy.

Other and further objects of my invention will appear from the following description.

In general my invention contemplates the provision of a potentiometer comprising an arcuate electrical contactor carried by a wobble plate loosely mounted on a shaft carried by a stationary support. A spring bearing between the support and the plate and a rolling bearing element eccentrically mounted on the shaft for rotation therewith act against each other to tilt the wobble plate to a position at which the contactor makes substantially point contact with the stationary resistance element. As the shaft turns, the point of engagement between the contactor and the resistance element changes.

In the accompanying drawings which form part of the instant specification and which are to be read in conjunction therewith and in which like reference numerals are used to indicate like parts in the various views:

FIGURE 1 is a sectional view of one form of my wobble plate potentiometer.

FIGURE 2 is a sectional view of the form of my wobble plate potentiometer shown in FIGURE 1 taken along the line 2—2 of FIGURE 1.

Referring now to the drawings my wobble plate potentiometer, indicated generally by the reference character 10, includes a housing 12 carrying a support 14 formed of a suitable insulating material. I mount the stationary resistance element 16 of my potentiometer on the support 14. It will readily be appreciated by those skilled in the art that the element 16 may be a film of a suitable material having a predetermined resistance per unit length. Alternatively, it may as well be a toroidal winding of wire, which winding has a given resistance per unit length. The housing 12 carries a pair of terminals 18 and 20 connected to the ends of the resistance element 16. A segment 19 of non-conductive material is disposed between the ends of element 16 to provide a continuous surface on which the wiper to be described hereinafter may ride. A suitable source of potential such, for example, as a battery 22 may be connected across the terminals 18 and 20 to provide a voltage drop along the length of the resistance element 16.

I employ any convenient means such, for example, as snap rings 24 and 26 for retaining a first bearing 28 in position within a boss 30 carried by the housing. A snap ring 32 retains a second bearing 34 in position within a boss 36 on an end plate 38 secured to the housing 12 by any suitable means known to the art. Bearings 28 and 34 rotatably support a shaft 40 in the housing 12.

I loosely mount a wobble plate 42 formed from a suitable insulating material such as plastic on the shaft 40 through the medium of an opening 44 formed in the center of the plate 42. The periphery of the plate or disk 42 carries a contactor 46 formed of conductive material. The contactor 46 may, for example, be provided by a film of electrically conductive material applied to the disk 42 by any suitable method known to the art. A flexible lead 48 provides an electrical connection between the contactor 46 and a terminal post 50 carried by the housing 12.

A coil spring 52 surrounding the boss 36 bears between the plate 38 and the wobble plate 42. An annular retainer 54 formed on the plate co-operates with the boss 36 to prevent the spring 52 from shifting to a position at which it acts eccentrically on the plate 42. In the particular form of my invention shown in FIGURES 1 and 2 of the drawings, spring 52 acts on the wobble plate 42 in a direction to urge the plate to move to a position at which the contactor 46 is out of engagement with the resistance element 16. It will readily be appreciated that the parts may be so arranged that the support 14 and the resistance element 16 are on the other side of plate 42 from that shown, in which case the spring 52 would urge plate 42 to move to a position at which the contactor 46 was in engagement with the resistance element 16. I have illustrated this alternative position of the resistance element 16 in dot dash lines in FIGURE 1 and have identified the construction by the reference character 56.

Any suitable means such, for example, as pins 58 and 60 pass through the shaft 40 and through the hubs of a pair of ball retainers 62 and 64 to secure the retainers 62 and 64 on shaft 40 for rotation therewith.

Each of the retainers 62 and 64 has a pair of arms 66 and 68 with respective openings 70 and 72. I dispose a first bearing ball 74 between the arms 66 of the respective retainers 62 and 64. I dispose a second bearing ball 76 between the other arms 68 of the retainers 62 and 64. It will be appreciated that the size of the openings in the retainer arms is such that they hold the balls in position with no play. The angular spacing of the arms 66 and 68 around the shaft 40 is such that the balls 74 and 76 are positioned to ride in spaced relationship in a race or annular groove 78 formed in the plate 42. As will be seen in FIGURE 2, I space arms 66 and 68 by an angle substantially less than 180° and substantially greater than 0° so that plate 42 will not become cocked owing to non-uniformity of either the plate 42 or the spring 52. Cocking would, of course, destroy the accuracy of my device. It will be seen from the structure just described that the spring 52 causes plate 42 to move to the left as viewed in FIGURE 1 to bring the groove 78 into engagement with the balls 74 and 76. When this occurs, the spring continues to act on the plate to cause the plate to swing or tilt about an axis passing through the centers of balls 74 and 76 until the contactor 46 makes substantially point contact with the resistance element 16. It will further be seen that as the shaft rotates, the balls 74 and 76 revolve about the shaft axis. As a result the axis of tilt of plate 42 shifts. As the axis of tilt of the contactor 46 shifts, the point of contact between the contactor 46 and the resistance element 16 changes.

In operation of my wobble plate potentiometer spring 52 acts on the plate 42 first to bring the race or groove 78 into engagement with the balls 74 and 76 and then to cause the plate to tilt about an axis passing through the centers of the balls 74 and 76. When this occurs, the contactor 46 makes substantially point contact with the resistance element 16. As shaft 40 turns, the balls 74 and 76 move around the shaft with the result that the axis of tilt of the plate 42 moves around the shaft and the point of contact between the contactor 46 and the resistive element 16 moves around the element. It will be seen that the point of contact may be moved from a point adjacent the point of connection between terminal 18 and the element 16 and the point of connection of terminal 20 and the element 16 to provide very nearly 360° of variation in potential at the terminal 50.

It will be seen that I have accomplished the objects of my invention. I have provided a wobble plate potentiometer which eliminates sliding contact between relatively movable elements. My wobble plate potentiometer permits the resistance element to be contacted at any point within a range of substantially 360°. My device is simple in construction and is reliable in operation. The wear of the contact is distributed over a very large area.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A potentiometer including in combination a support, a shaft, means mounting said shaft for rotary movement on said support, a plate, interengageable electrical elements comprising a resistance element and a contact element, said elements being of arcuate configuration and carried respectively by said plate and by said support, said plate being loosely carried by said shaft, resilient means carried by said support and engaging said plate for normally urging said plate to move in one direction with respect to the axis of said shaft and means carried by said shaft and engaging said plate at points angularly spaced around said shaft by an angle substantially less than 180° and substantially greater than 0° and acting against said resilient means for tilting said plate with respect to the axis of said shaft to cause said electrical elements to make substantially point contact.

2. A potentiometer including in combination a support, a shaft, means mounting said shaft for rotary movement on said support, a plate, interengageable elements comprising a resistance element and a contact element, said elements being of arcuate configuration and carried respectively by said plate and by said support, said plate being loosely carried by said shaft a spring in engagement with and acting between said support and said plate for urging said plate to move in one direction axially of said shaft, respective elements adapted to engage said plate and means mounting said elements on said shaft in circumferentially spaced relationship with an interelement angular spacing of substantially less than 180° and substantially greater than 0° in engagement with said plate at spaced points to tilt said plate against the action of said spring to cause said electrical elements to make substantially point contact.

3. A potentiometer including in combination a support, a shaft, means mounting said shaft for rotary movement on said support, a plate, interengageable electrical elements comprising a resistance element and a contact element, said elements being of arcuate configuration and carried respectively by said plate and by said support, said plate being loosely carried by said shaft a spring in engagement with and acting between said support and said plate to urge said plate to move in one direction along the axis of said shaft, a pair of balls, means mounting said balls on said shaft in circumferentially spaced relationship with an interball angular spacing of substantially less than 180° and substantially greater than 0° in engagement with said plate to tilt the plate against the action of said spring to cause said electrical elements to make substantially point contact.

4. A potentiometer including in combination a support of insulating material, a resistance element of arcuate configuration carried by said support, a shaft, means mounting said shaft for rotary movement on said support, a plate of insulating material, said plate being loosely carried by said shaft an electrically conductive element of arcuate configuration carried by said plate and adapted to engage said resistance element, a spring in engagement with and acting between said support and said plate on one side thereof for urging said plate to move in one direction along the axis of said shaft, a pair of balls and means mounting said balls on said shaft in circumferentially spaced relationship with an interball angular spacing of substantially less than 180° and substantially greater than 0° at a position along said shaft at which said balls engage said plate on the other side thereof to tilt said plate against the action of said spring to bring said conductive element into substantially point contact with said resistance element.

References Cited in the file of this patent

UNITED STATES PATENTS

| | | |
|---|---|---|
| 948,275 | Gernsback | Feb. 1, 1910 |
| 1,987,969 | Parkin | Jan. 15, 1935 |
| 2,000,178 | Kenny | May 7, 1935 |